United States Patent Office 2,842,228
Patented July 8, 1958

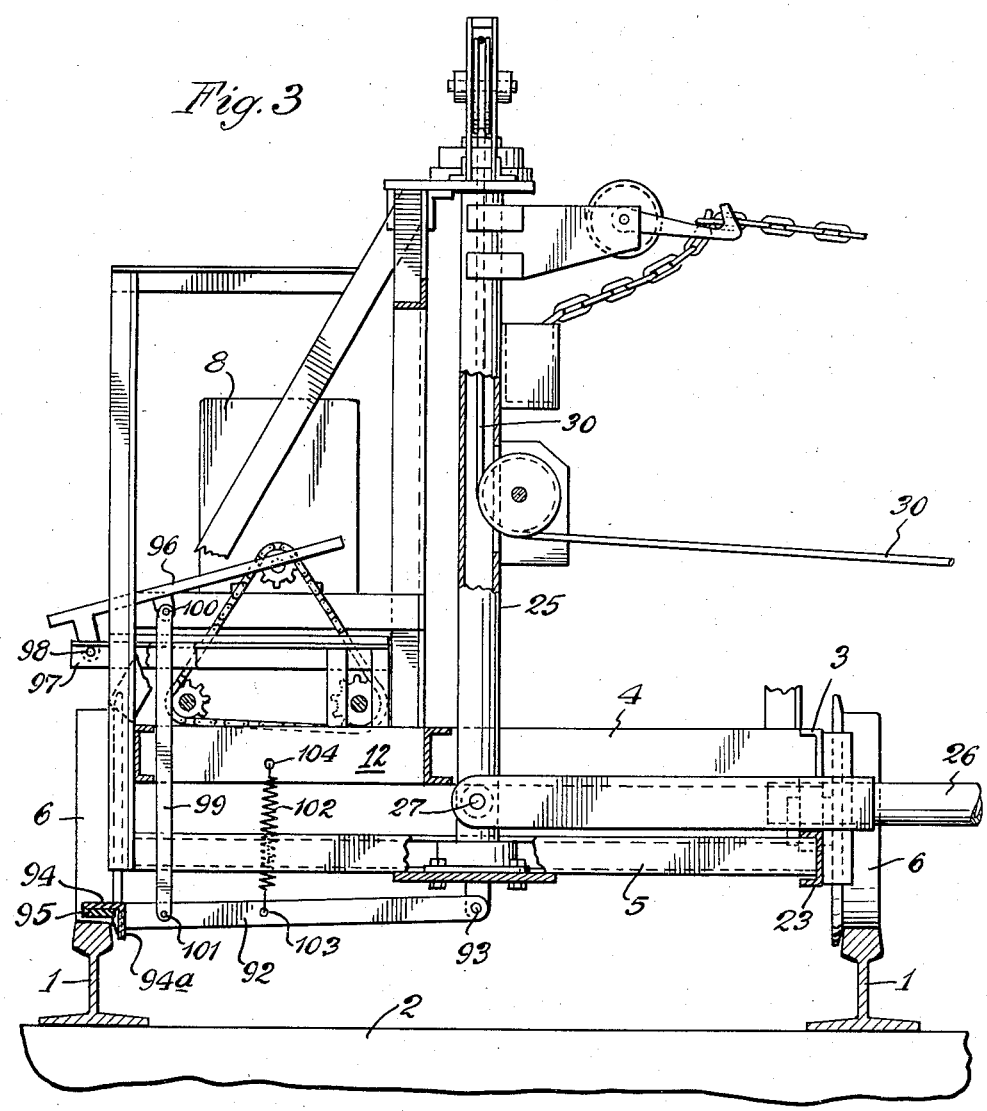

2,842,228
BRAKING MECHANISM FOR TRACK VEHICLES

Bernard Geier, Scranton, Pa., and John P. Hiltz, Jr., New York, N. Y.

Original application March 28, 1952, Serial No. 279,162. Divided and this application October 1, 1953, Serial No. 383,569

4 Claims. (Cl. 188—41)

This invention relates to an improvement in braking mechanism for track-supported vehicles.

One object of the present invention is the provision of a braking mechanism for a track-supported vehicle which serves to retard the progress of the vehicle along the track and also serves to resist side thrusts on the machine developed by a working mechanism positioned laterally of the vehicle.

Another object is the provision of a braking mechanism for track-supported vehicles which is conveniently actuated by the operator of the vehicle.

Other objects and purposes will appear from time to time in the course of the specification and claims.

This application is a division of our copending application S. N. 279,162 filed in the United States Patent Office on March 28, 1952, now abandoned.

The invention is illustrated more or less diagrammatically in the accompanying drawings wherein:

Figure 3 is a sectional view taken on the line 3—3 of Figure 2.

Like parts are indicated by like symbols throughout the specification and drawings.

Figure 1:
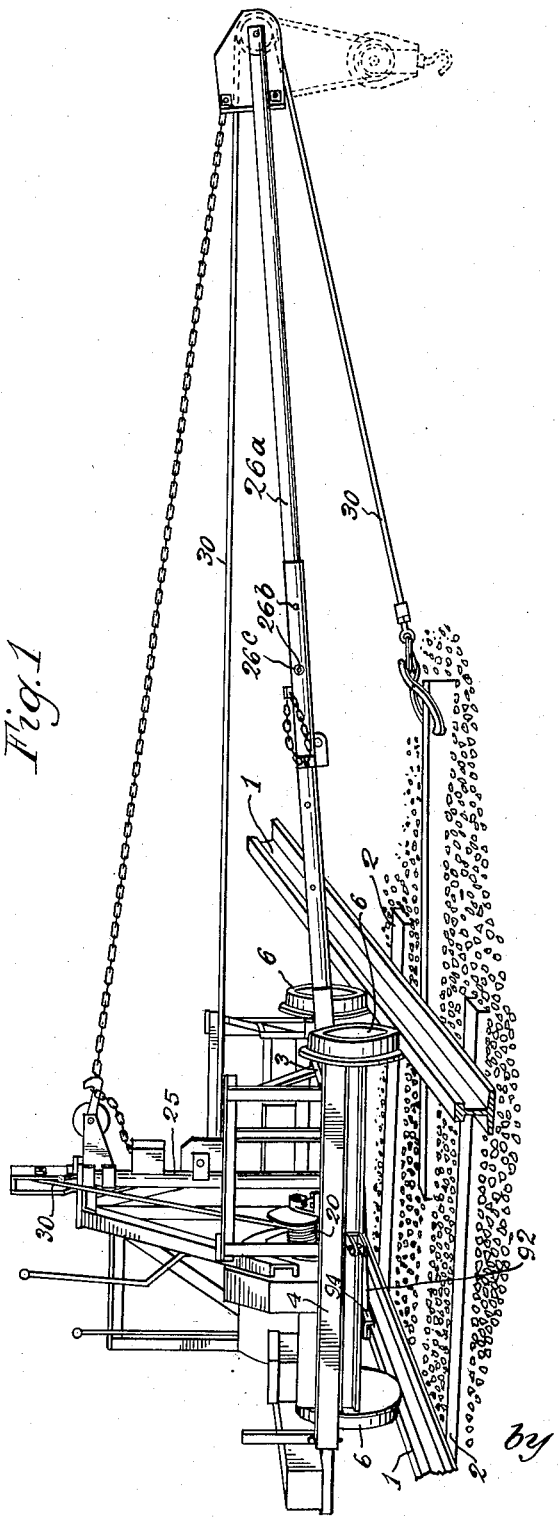
Figure 1 is a perspective view illustrating a typical track-supported vehicle provided with the braking mechanism of the present invention.

Referring to the drawings, 1,1 illustrate the rails of a track and 2 the ties upon which the rails rest.

Referring to the actual structure, we may employ any suitable frame as shown for example in Figure 3, which may include longitudinal frame members 3, transverse end frame members 4 and transverse intermediate frame members 5. It will be understood that the details of the frame may be widely varied without departing from the spirit of our invention. The frame is movably supported on the rails for example by flanged wheels 6 on any suitable axles 7. 8 generally indicates an engine or suitable power plant, the details of which do not of themselves form part of the present invention.

We wish it to be understood that the power plant 8 is adapted, through suitable mechanism, for propelling the vehicle along the tracks rails 1. The details of the propelling mechanism in themselves form no part of the present invention and are, therefore, not described herein.

Figure 2:
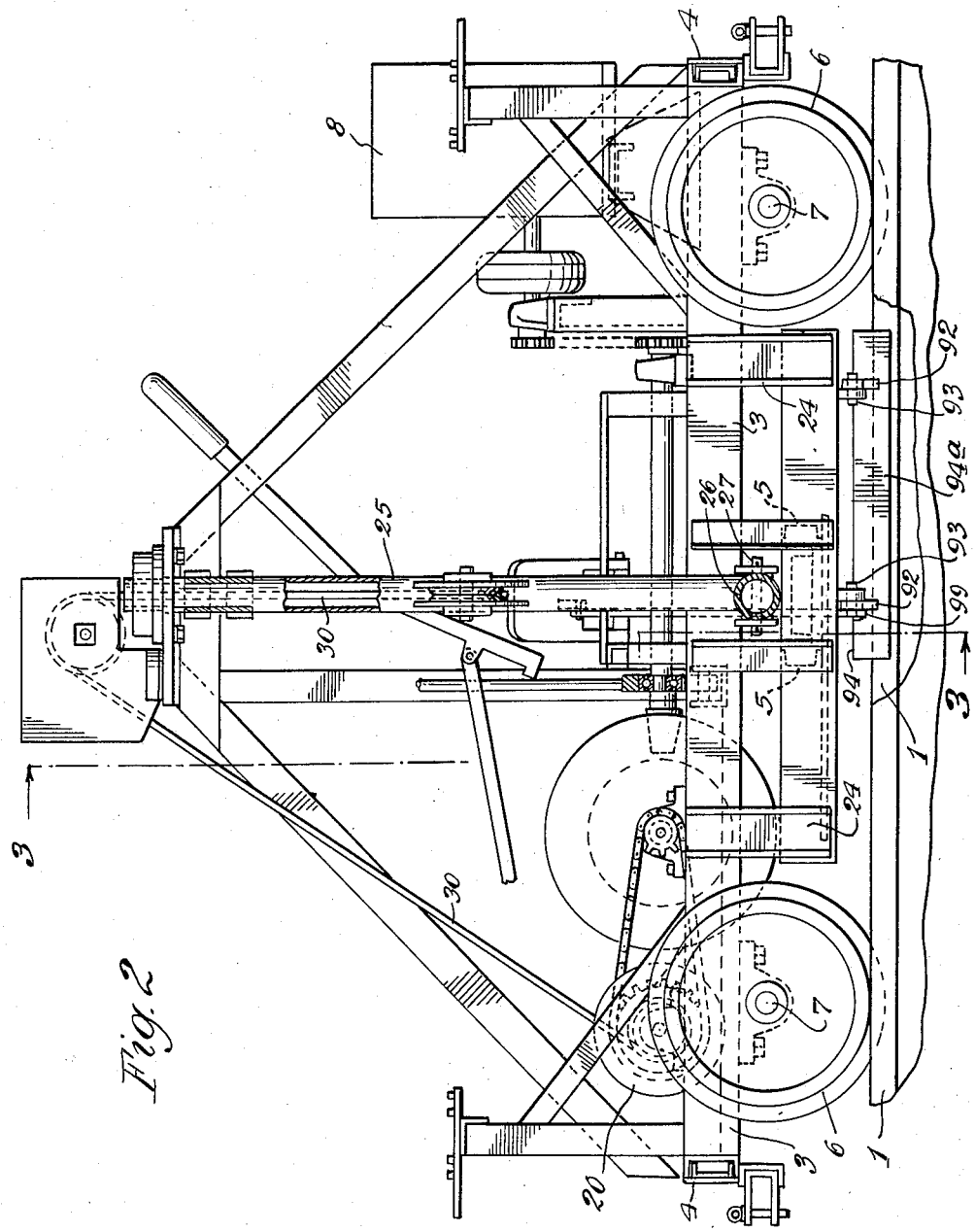
Figure 2 is a side elevational view of the machine shown in Figure 1.

We find it advantageous to provide a depending frame generally indicated at 23 for example in Figure 3, which includes suitable horizontal frame elements and vertical supporting elements 24 in Figure 2. Rotatably mounted upon the depending frame is a hollow, vertical mast 25. Pivoted to the lower end of the mast is a tubular boom 26, the fork of which may be pivoted for example upon any suitable pivoting element or pin 27 as shown in Figure 2. It is preferably provided with a telescopic auxiliary inner boom element 26a which may be suitably held or adjusted in extended or withdrawn position, as by apertures 26b, as shown for example in Figure 1, into which a pin 26c may be inserted through a suitable aperture in the inner telescopic boom element 26a.

The boom 26a is representative of a typical working implement extending laterally from the track-supported vehicle. The implement as shown may be used for many purposes, one of which for example is removing ties from beneath the track rails and repositioning ties thereunder. Boom 26a may also be employed to raise and lower any articles or materials along the right-of-way.

A cable 30 is reeved about one end of the boom and is adapted for actuation by means of any suitable winding and reeling mechanism positioned on the vehicle and driven by the power plant 8. We wish it to be understood that the details of the boom and mast structure, together with the winding and reeling mechanism, form no part of the present invention and are described herein merely by way of illustration of a typical track-working implement.

In order to stop the machine and hold the machine in position along the track with respect to the track, we employ a foot pedal operated brake structure. This brake structure includes a brake shoe carrying member 92 pivoted about an axis 93, extending generally parallel with the track and in a plane generally parallel to the general plane of the base of the machine. A brake shoe attaching member 94, extending parallel to the track rail intermediate the front and rear wheels of the machine, is carried by the supporting member 92. As shown the member 94 includes a depending portion 94a adapted to abut against the side of a rail of the track. The depending portion 94a is adapted to abut against the track rail and resist side thrust of the machine when the cable is being reeled in about the drum 20. A suitable brake shoe 95 is fitted to the underside of the brake shoe attaching member 94. When the brake shoe carrying member 92 is swung about the axis 93, the brake shoe will be moved into and out of engagement with the track rail, providing a convenient means for stopping the machine and holding the machine in place with respect to the track rail.

A brake actuating member 96 is pivoted to the operator platform 97 at 98. A connecting link 99 is pivoted to the actuating lever 96 at 100 and at its other end to the brake shoe carrying member 92 at 101. As lever 96 is swung clockwise about its pivot 98, the connecting link 99 will force the brake shoe carrying member 92 counterclockwise and force the brake shoe 95 into engagement with the track rail 1. The actuating lever 96 is positioned on the operator platform so that the operator may conveniently actuate the brake while the machine is traveling along the rails or when the boom is in use. A spring 102, secured to the lever 92 as at 103 and at its other end to the frame member 12 as at 104, normally hold the brake shoe 95 in inoperative position as illustrated in Figure 3.

While we have shown and described a preferred form of our invention, we wish it to be understood that the machine shown and described herein is to be taken in an illustrative or diagrammatic sense and that the machine is capable of many modifications within the spirit of our invention and we therefore wish our invention to be limited only as defined by the hereinafter appended claims.

The use and operation of our invention are as follows:

The machine is propelled along the track to any spot wherein it is desired to perform some working operation. The operator of the machine when approaching that spot depresses the pedal 96 by simply standing upon the pedal 96. The weight of the operator is sufficient to force the brake 95 into frictional engagement with the rail 1 and the machine will gradually be brought to a stop. When in that same spot or position along the right-of-way, suitable working operations are carried out. At that position, for example, the boom 26a may be employed to pull ties from beneath the rails of the track. During the course of such working operations the brake 95 is engaged with the rail 1 and the braking portion 94a resists side thrusts developed in the course of those working operations. The weight of the operator is sufficient to hold the machine in position along the rails and at the same time maintain the braking portion 94a in position against the side of the rail.

When it is desired to reposition the machine along the track, the operator simply removes his foot from the pedal 96 and the spring 102 pulls the brake out of engagement with the rail.

We claim:

1. In a track working machine adapted to be movably supported on the rails of a track, a main frame having wheels adapted to be supported by the track, a power mechanism on the frame constructed, in use, to apply a substantial thrust to the frame generally in a horizontal direction in the general plane of the frame but transverse to the track, a thrust transmitting structure pivoted below the main frame and constructed to transmit the force of the transverse thrust from the frame directly to the track to bypass the wheels, said force transmitting structure including an abutment member extending generally parallel to the track and pivotally supported on the frame so as to be movable down into operative position transversely opposite the side of the rail and up into inoperative position between the frame and the top of the rail, a generally vertical portion on the abutment member constructed to engage the side of a rail in opposition to the transverse thrust of the power mechanism, and an operator actuated control linkage extending down through the frame connected to the pivoted abutment member, and constructed, when actuated and held by the operator, to pivot the vertical portion of the abutment member from inoperative position down into operative position in general transverse opposition to the side of the rail so that, when the transverse thrust is applied to the frame by the power mechanism, the force thereof will be transmitted through the frame and force transmitting structure directly to the rail bypassing the wheels.

2. The structure of claim 1 further characterized in that the thrust transmitting structure includes a brake shoe portion on the generally vertical portion adapted, when the operator actuated control linkage is actuated, to overlie the top of the rail in frictional engagement therewith so that, in addition to transmitting the force of the transverse thrust from the frame to the rail, the structure will, at the same time, brake the frame.

3. The structure of claim 1 further characterized by and including yielding means biasing the thrust transmitting structure to inoperative position between the frame and the top of the rail out of transverse alignment with the rail when the control linkage is not actuated by the operator.

4. In a track working machine adapted to be movably supported on the rails of a track, a main frame having wheels adapted to be supported by the track, a power mechanism on the frame constructed, in use, to apply a substantial thrust to the frame generally in a horizontal direction in the general plane of the frame but transverse to the track, a thrust transmitting structure movable below the main frame and constructed to transmit the force of the transverse thrust from the frame directly to the track to bypass the wheels, said force transmitting structure including an abutment member extending generally parallel to the track and movably supported on the frame so as to be movable down into operative position transversely opposite the side of the rail and up into inoperative position between the frame and the top of the rail, a generally vertical portion on the abutment member constructed to engage the side of a rail in opposition to the transverse thrust of the power mechanism, and an operator actuated control linkage extending down through the frame connected to the movable abutment member, and constructed, when actuated and held by the operator, to move the vertical portion of the abutment member from inoperative position down into operative position in general transverse opposition to the side of the rail so that, when the transverse thrust is applied to the frame by the power mechanism, the force thereof will be transmitted through the frame and force transmitting structure directly to the rail bypassing the wheels.

References Cited in the file of this patent
UNITED STATES PATENTS

| | | |
|---|---|---|
| Re. 11,693 | Davis | Sept. 20, 1898 |
| 147,603 | Casement | Feb. 17, 1874 |
| 347,501 | Muller | Aug. 17, 1886 |
| 838,549 | Koonse | Dec. 18, 1906 |
| 1,762,705 | Vaughn | June 10, 1930 |
| 2,082,594 | Philbrick | June 1, 1943 |